United States Patent [19]

Browning, III

[11] 3,854,233

[45] Dec. 17, 1974

[54] FISHING LURE

[76] Inventor: Paul T. Browning, III, 1825 Zinnia Dr., Indianapolis, Ind. 46219

[22] Filed: Oct. 17, 1973

[21] Appl. No.: 407,221

[52] U.S. Cl............. 43/42.29, 43/42.08, 43/42.31
[51] Int. Cl........................................... A01k 85/00
[58] Field of Search............. 43/42.28, 42.29, 42.3, 43/42.08, 42.31

[56] References Cited
UNITED STATES PATENTS

| | | | |
|---|---|---|---|
| 1,272,183 | 7/1918 | Arnold | 43/42.29 |
| 1,727,936 | 9/1929 | Pflueger | 43/42.08 |
| 2,219,225 | 10/1940 | Gambill | 43/42.08 |
| 2,613,471 | 10/1952 | Traycik | 43/42.31 |
| 2,659,176 | 11/1953 | Wenger | 43/42.31 |
| 3,698,119 | 10/1972 | Levoin | 43/42.08 |

Primary Examiner—Louis G. Mancene
Assistant Examiner—Daniel J. Leach
Attorney, Agent, or Firm—Woodard, Weikart, Emhardt & Naughton

[57] ABSTRACT

Disclosed is a fishing lure of the type having a soft rubber or plastic tail component. A stainless steel wire extends axially through a closed end of a generally tubular lure and is shiftable longitudinally within the lure. The leading end of the wire is connected to a fishing line and the trailing end has a transversely bent tip to which the tail component can be impaled and then pulled partially into the tubular lure body. A hook bearing member is attached to the wire and trails the lure with the hook thereon adapted to be embedded in the tail component.

3 Claims, 3 Drawing Figures

FISHING LURE

BACKGROUND OF THE INVENTION

Fishing lures having a hard forward portion or body and trailing rubber or plastic legs or skirt member are not unknown in the prior art, an example of such construction being disclosed in U.S. Pat. No. 3,740,889. Lures having detachable trailing or tail components are also known in the prior art, an example being the lure disclosed in U.S. Pat. No. 3,172,227.

The structure of the present invention provides an improved, simplified means for attaching and detaching elastomeric tail components to the lure body so that the soft rubber, or other elastomeric trailing streamers, legs, etc. can be replaced when damaged by fish or by prolonged use. This is accomplished by utilizing a unitary, steel wire to which a line or leader is attached, the wire extending axially through the tubular lure body. Pushing the wire inwardly from the tip of the lure exposes the hooked, rear end of the wire outside the lure body and the soft, elastomeric tail component may be impaled on the wire. The wire is then pulled outwardly from the lure tip and the tail portion will, consequently, be drawn and locked into the tubular lure body to provide a smooth junction between the body and tail portion of the lure. A flexible lead for a hook assembly is attached to an eyelet formed intermediate along the wire's length and the hook assembly carried by the flexible lead, extending from the rear of the tubular body, is hooked into the trailing tentacles or legs of the elastomeric tail portion of the lure.

DESCRIPTION OF THE PREFERRED EMBODIMENT

Figure 1:
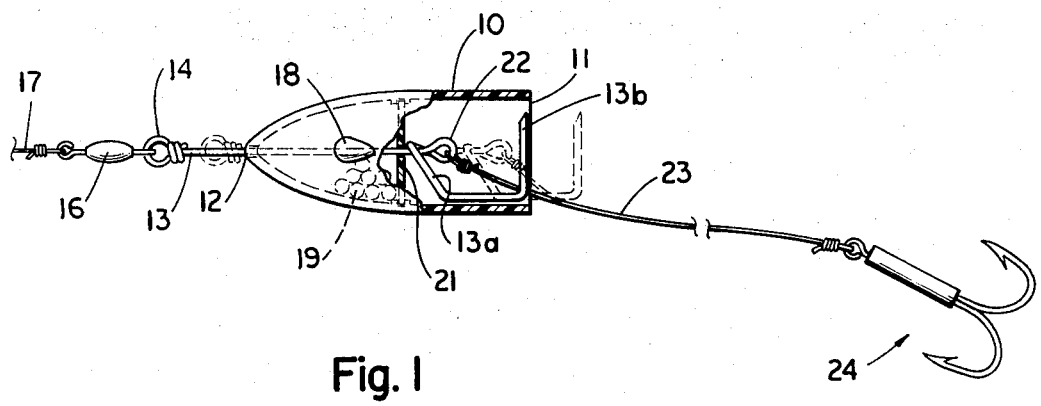
FIG. 1 is a side view, partially in section, showing the tubular body portion of a lure embodying the present invention.

Referring initially to FIG. 1, the lure is formed by a tubular body 10 having a trailing, open end 11 and a closed, tapered leading end 12. A relatively rigid wire 13, preferably formed of stainless steel, extends centrally through the body 10 and through a suitable aperture in the closed end 12 of the body. At its front or leading end the wire is bent to provide an eyelet 14 to which may be attached a conventional swivel 16 and a fishing line or leader, indicated fragmentarily at 17.

The exterior of the housing 10 may be provided with eye-simulating protrusions 18 and the interior with loose particles 19, such as lead shot, which provide a rattling sound when the lure is in use and, thus, audial stimulation to fish in the area of the lure. The shot particles 19 are enclosed in a compartment formed by a transverse partition 21 which divides the interior of the body 10. The wire 13 extends through an aperture in the partition 21 and is looped upon itself to provide an intermediate eyelet 22 to which is attached a hook-bearing member such as the flexible member 23. Member 23, preferably, is a three to four inch length of relatively high test monofilament fishing line and extends out of the open end 11 of the lure body and carries a conventional multiple-hook assembly 24.

Figure 2:
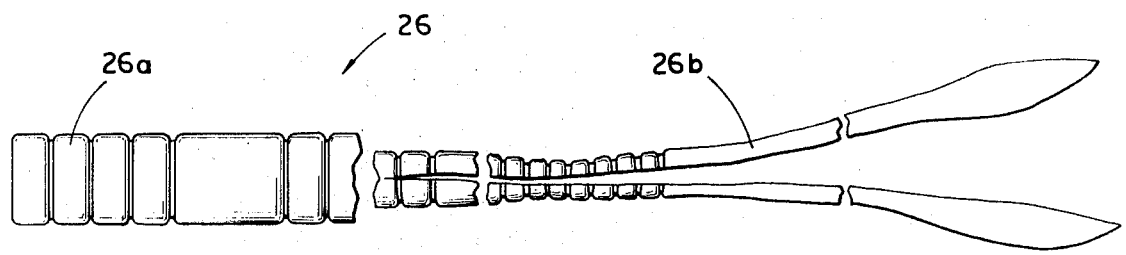
FIG. 2 is a side view of the tail or trailing component of the lure.

The portion of the wire 13 rearward of eyelet 22, this portion being identified at 13a in FIG. 1, extends toward and along the tube wall and terminates in a transversely bent tip 13b located in the lure body 10 and adjacent its open end 11. The trailing or tail component of the lure is illustrated in FIG. 2 and there identified generally at 26. The front portion 26a and the rear portion 26b are integrally molded of any suitable, relatively soft elastomeric material and may be of uniform or varying color, it being envisaged that any one of variously colored or shaped portions 26b may be utilized with the body portion of the lure.

Figure 3:
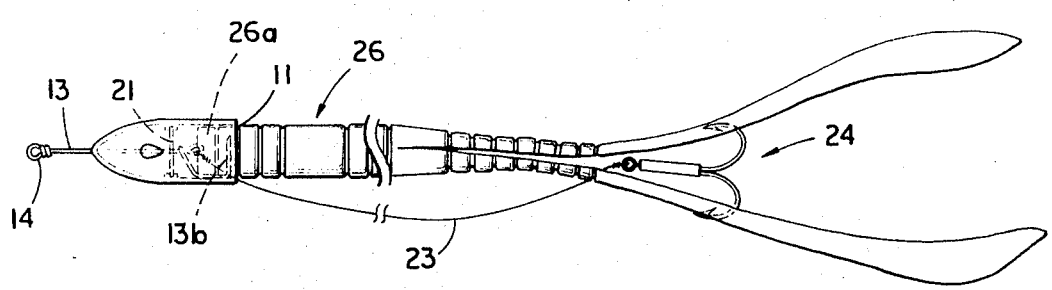
FIG. 3 is a side view of the complete lure with the front portion of the tail component drawn into the body of the lure.

The completely assembled lure is shown in FIG. 3, and the portion 26 is attached to the lure body by first pushing the wire 13 rightwardly (as viewed in FIG. 1) to its broken line position of FIG. 1. This moves the tip 13b to the exterior of the body and the front portion 26a of the trailing component 26 is then impaled on the wire tip 13b. Pulling the wire 13 back to its solid line position of FIG. 1, that is, moving the wire to its maximum extended position, draws the tip 13b and the impaled portion 26a into the tubular lure body, as will be evident from FIG. 3. The hook assembly 24 may be hooked into the trailing portion 26b to complete assembly of the lure.

When the trailing, rubber component 26 is to be replaced, manipulation of the wire 13 to its broken line position of FIG. 1 permits removal of the portion 26a and replacement as desired.

The flexible tail component 26 is partially drawn within the lure body, that is, the impaled portion 26a of the tail is completely within the lure body and it is there protected from tearing away from the wire by fish, or by snags while the lure is in use. The body and tail component junction is thus smoothly contoured and, moving through the water, no reactive force is exerted on the tail component, at the junction, tending to separate the body and tail members. The flexibility of lead 23 permits the hook assembly to be positioned as desired on the trailing portion 26b.

I claim:

1. A fishing lure having a tubular body with a leading closed end and a trailing open end, a wire extending centrally through said body and leading closed end and protruding substantially beyond said leading closed end, said wire being slidable within the body between positions of maximum and minimum extension from the leading end of the lure body, a line or leader attaching eyelet formed on the extending tip of said wire, the opposite end of said wire having a transversely bent tip which is positioned at said trailing open end of the body when said wire is in said maximum extended position and is spaced exteriorly of the open trailing end of the body when the wire is in said minimum extended position, a detachable tail component for the lure formed of elastomeric material and adapted for impalement on said transversely bent tip of the wire when the wire is in its said minimum extended position and being drawn into said body when the wire is moved to its said maximum extended position, a hook-bearing member attached to an eyelet formed in said wire, said hook-bearing member extending from the trailing end of said body and carrying at least one hook adapted to be imbedded in said elastomeric tail component.

2. A fishing lure as claimed in claim 1 in which a transverse partition divides the interior of said body and limits the depth to which said lure tail component may be drawn into the lure body.

3. A fishing lure as claimed in claim 2 in which loose, rattle-making particles are provided in the compartment formed in the lure between its closed leading end and said transverse partition.

* * * * *